TRANSISTOR AMPLIFIER DEVICE EQUIPPED WITH A PHONE

Filed Sept. 18, 1962

INVENTOR
JACQUES DE ROBIEN
BY
Frank R. Trifari
AGENT 3,172,955
Patented Mar. 9, 1965

3,172,955

TRANSISTOR AMPLIFIER DEVICE EQUIPPED WITH A PHONE

Jacques de Robien, Boulogne-sur-Seine, France, assignor to North American Philips Company, Inc., New York, N.Y., a corporation of Delaware Filed Sept. 18, 1962, Ser. No. 224,405
Claims priority, application France, Sept. 21, 1961, 873,856; Aug. 16, 1962, 907,045
2 Claims. (Cl. 179—1)

This invention relates to transistor amplifier devices, comprising means for changing from reproduction by means of a loudspeaker to reproduction by means of an ear-phone. Such commutation is frequently used in transistor receivers. When listening via a loudspeaker of more or less small dimensions is changed to listening via an ear-phone, a considerable economy in the consumption of the battery may result therefrom. Thus, it is known to include an ear-phone in series in the circuit of the collector of the transistor with which one of the low-frequency amplifying stages preceding the so-called power stage is equipped. This power stage, which energizes the loudspeaker, is usually preceded by one or more low-frequency pre-amplifier stages. It will be evident that, if the ear-phone may be included in the circuit of one pre-amplifier stage, the supply for the power stage becomes unnecessary. If said replacement could be carried out without particular difficulty, an important saving in the total current delivered by the supply source could be obtained, for example as much as 12 ma. if the final stage is equipped with two transistors of type OC 74.

However, the problem is actually more complicated, namely because of the connections required for changing over at will from the operation with loudspeaker to the operation with ear-phone, and conversely. The switching operations to be carried out are the following:

(*a*) Switch off the internal loudspeaker.

(*b*) Switch on the ear-phone or, if the ear-phone is constantly connected to the receiver and short-circuited during the operation of the loudspeaker, eliminate the short-circuit.

(*c*) Avoid additional distortion resulting from the parallel connection of the non-linear elements to the ear-phone (for this reason, for example, in the device mentioned in the preamble, the primary winding of the output transformer of the pre-amplifier stage is switched off).

(*d*) Switch on the ear-phone preferably by means of a contact plug of existing type (notably a telephone contact plug) which is manufactured in mass, or at any rate by means of a switching element the price of which is not considerably higher than that of such a contact plug.

The invention is characterized in that the supply lead to the emitter of a transistor for energizing the loudspeaker includes an interrupter the contacts of which are interrupted when the ear-phone is switched into the input circuit of the said transistor.

In order that the invention may be readily carried into effect, it will now be described in detail, by way of example, with reference to the accompanying diagrammatic drawing, in which.

Figure 1:
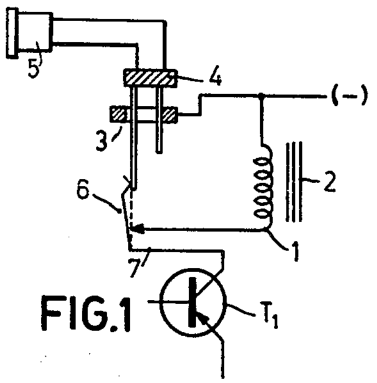
FIG. 1 shows a known device with an ear-phone.
Figure 2:
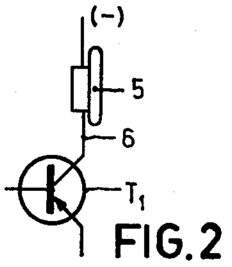
FIG. 2 shows a simplified form of FIG. 1.

In FIGS. 1 and 2, the transistor of the low-frequency pre-amplifier stage of a wireless receiver is indicated by $T_1$. The collector circuit of this transistor includes in series a primary winding 1 of a transformer 2 which connects said stage to the next stage (not shown). A contact sleeve 3 for a contact plug 4, for example a telephone contact plug, the wires of which terminate in an ear-phone

5, is provided on one terminal of the primary winding 1. If desired, two parallel ear-phones may be used. The assembly is designed so that, due to the insertion of the contact plug 4 into the contact sleeve 3, a contact 6 between a conductor 7 connected to the collector of transistor $T_1$ and the winding 1 is interrupted. The phone 5 may be of some usual type or other and has, if it is of the simple type, an impedance of, for example, 1,500 ohms at 800 to 1,000 c./s.

Figure 3:
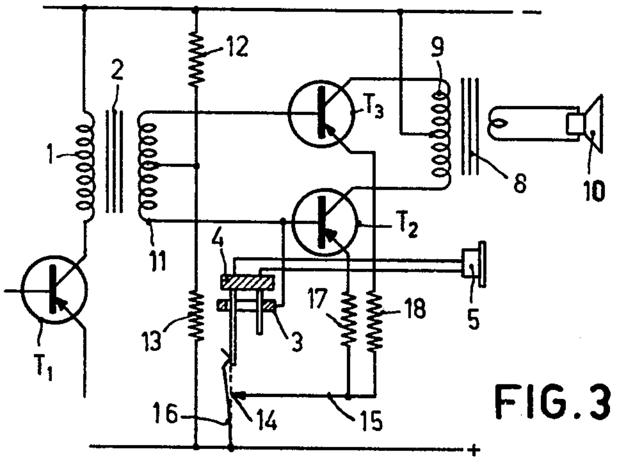
FIG. 3 shows a device according to the invention.

In FIG. 3, a circuit is illustrated constructed according to the invention in which it is possible to change from reproduction by means of a loudspeaker 10 of a wireless receiver to an ear-phone 5 (or two parallel ear-phones). The transistor of the low-frequency pre-amplifier stage is again indicated by $T_1$ and the push-pull coupling transformer between this stage and the next stage again by 2. $T_2$ and $T_3$ are two transistors (preferably of the same type and connected in push-pull) of the output stage which supplies the loudspeaker 10 through a push-pull output transformer 8. Each half of a primary winding 9 is connected in series in the collector circuit of one of the transistors $T_2$ and $T_3$ and the centre tapping of said winding is connected to the negative terminal of a supply source. The ends of a secondary winding 11 of coupling transformer 2 are connected to the control electrodes (the bases in the figure) of the transistors $T_2$ and $T_3$ respectively and its centre tapping is connected to the common junction of a voltage divider comprising two resistors 12 and 13 connected in parallel with the supply source.

According to the invention, the contact sleeve 3 of the contact plug 4 is no longer connected in parallel to the primary winding 1 of coupling transformer 2, but between one of the terminals of the secondary winding 11 thereof and the positive terminal of the supply source. The assembly is designed so that, due to the insertion of the plug 4 into the contact sleeve 3, a contact 14 between conductors 15 and 16, which normally connects the emitters of the transistors $T_2$ and $T_3$ through preferably identical resistors 17 and 18 to the positive terminal of the supply source, is interrupted.

Figure 4:
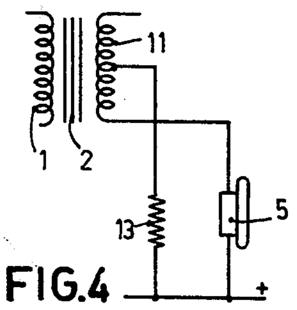
FIGS. 4 and 5 show simplified diagrams which serve to explain the operation of the device shown in FIG. 3.
Figure 5:
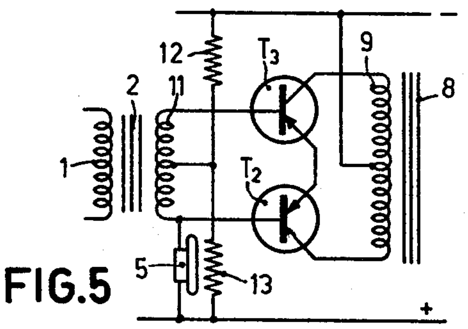

To explain the operation of the assembly thus obtained, FIG. 3 is reduced to the simplified diagram shown in FIG. 4 or the more complete diagram shown in FIG. 5. The latter diagram clearly shows that the emitter circuits of the two transistors $T_2$ and $T_3$ are interrupted so that these transistors are not conducting, provided that the peak voltage at the terminals of the secondary winding of coupling transformer 2 remains lower than the supply voltage, or lower than the emiter-base Zener voltage of the transistors $T_2$ and $T_3$ respectively. However, due to the switching in of the phone 5, the secondary winding 11 is loaded so heavily that said peak voltage cannot assume a value which is unduly high.

On the other hand, the two output transistors $T_2$ and $T_3$ parallel to the ear-phone 5 do not introduce distortions since they may be regarded in practice as infinitely high impedances. Since the ear-phone 5 is no longer connected in series with the transformer 2, as is the case in FIG. 1, the total voltage delivered by the supply source remains available for feeding the pre-amplifier stage, so that a piezoelectric ear-phone may be used, if desired.

It will be evident that within the scope of the invention, modifications in the embodiments above described are possible, notably by using equivalent technical means. Thus, the amplifier may also serve, for example, as a reproduction amplifier for gramophone recordings or recordings on a magnetic tape. In addition, instead of the transformer 2 shown, it is fundamentally possible to use any conventional coupling between the stages $T_1$ and $T_2$–$T_3$. The transistors $T_2$ and $T_3$ may fundamentally also be operated in grounded-base connection (which is, however, less economical), in which event their bases are connected to the common point of the resistors 12 and 13, their emitters are connected to the ends of the winding 11 and the centre tap of this winding is connected via the interruptor 14–16 to the positive terminal of the supply source.

What is claimed is:

1. A private listening jack arrangement for a transistor amplifier device for switching from loudspeaker reproduction to an alternate form made available at the private listening jack comprising a three electrode transistor, a two terminal voltage supply source, means for connecting a first transistor electrode to one terminal of the voltage supply source and for coupling alternating electric energy to a loudspeaker, means including an interruptable contact for connecting a second transistor electrode to the other terminal of the voltage supply source, signal input means connected between two of said transistor electrodes, said transistor amplifying the signal and passing it on to the loudspeaker whenever the second electrode is connected through the interruptable contact to the other voltage supply terminal, and a jack having one terminal connected to the signal input means and physically arranged with respect to said interruptable contact to break the connection between the other terminal of the voltage supply and the second transistor electrode when a plug is inserted in the jack whereby the transistor draws no current from the voltage supply and the loudspeaker is disabled and provide first and second connections at said plug across the input signal source.

2. A private listening jack arrangement for a transistor amplifier device for switching from loudspeaker reproduction to reproduction by means of said private listening jack comprising, a two terminal source of energy supply, a transistor having emitter, base and collector electrodes, means for inserting the loudspeaker in a connection between said collector and one terminal of the supply source, means for connecting the other terminal of the supply source to the emitter electrode including an interrupting means to interrupt the flow of supply current to the transistor when the listening jack is operated, signal input means for applying oscillations between the base electrode and emitter electrode to operate the loudspeaker, and said interrupting means being provided to connect said signal input means to the listening jack and to interrupt the flow of signal energy to the loudspeaker when operated.

References Cited in the file of this patent

UNITED STATES PATENTS

| | | |
|---|---|---|
| 2,895,007 | Soderbaum | July 14, 1959 |
| 2,898,405 | Eck | Aug. 4, 1959 |